(12) United States Patent
Schwindt et al.

(10) Patent No.: US 8,718,899 B2
(45) Date of Patent: May 6, 2014

(54) DRIVER ASSISTANCE SYSTEMS USING RADAR AND VIDEO

(75) Inventors: Oliver Schwindt, Novi, MI (US); Maria Eugenia Garcia Bordes, Northville, MI (US)

(73) Assignee: Robert Bosch GmbH, Stuttgart (DE)

(*) Notice: Subject to any disclaimer, the term of this patent is extended or adjusted under 35 U.S.C. 154(b) by 8 days.

(21) Appl. No.: 13/529,385

(22) Filed: Jun. 21, 2012

(65) Prior Publication Data

US 2012/0330528 A1    Dec. 27, 2012

Related U.S. Application Data

(60) Provisional application No. 61/499,777, filed on Jun. 22, 2011.

(51) Int. Cl.
*B60K 31/00* (2006.01)

(52) U.S. Cl.
USPC ............................. 701/96; 180/170

(58) Field of Classification Search
USPC ........................... 701/96; 180/170
See application file for complete search history.

(56) References Cited

U.S. PATENT DOCUMENTS

| | | | |
|---|---|---|---|
| 6,151,539 A | 11/2000 | Bergholz et al. | |
| 7,009,500 B2 | 3/2006 | Rao et al. | |
| 7,355,524 B2 | 4/2008 | Schofield | |
| 7,830,243 B2 | 11/2010 | Buckley et al. | |
| 2002/0016663 A1* | 2/2002 | Nakamura et al. | 701/96 |
| 2010/0295707 A1 | 11/2010 | Bennie et al. | |

FOREIGN PATENT DOCUMENTS

| | | |
|---|---|---|
| EP | 1065520 A2 | 1/2001 |
| EP | 1519203 A1 | 3/2005 |
| EP | 1923718 A1 | 5/2008 |
| WO | 03029045 A2 | 4/2003 |

OTHER PUBLICATIONS

International Search Report and Written Opinion for Application No. PCT/US2012/043503 dated Nov. 23, 2012 (16 pages).

* cited by examiner

*Primary Examiner* — Mary Cheung
*Assistant Examiner* — Yuen Wong
(74) *Attorney, Agent, or Firm* — Michael Best & Friedrich LLP

(57) ABSTRACT

A driver assistance system that includes a RADAR system, a video system, a brake control unit, and a controller, such as an engine control unit. The RADAR system is mounted on the front of the vehicle and is positioned to detect the location of various objects. The video system captures video images. The controller receives data from both the RADAR system and the video system and identifies objects and their locations based on both the RADAR and the video data. The controller then adjusts the operation of the engine and the vehicle brakes based on the identified objects and their locations. In some embodiments, the driver assistance system also includes a human-machine interface that notifies the driver when an object is identified and located.

12 Claims, 2 Drawing Sheets

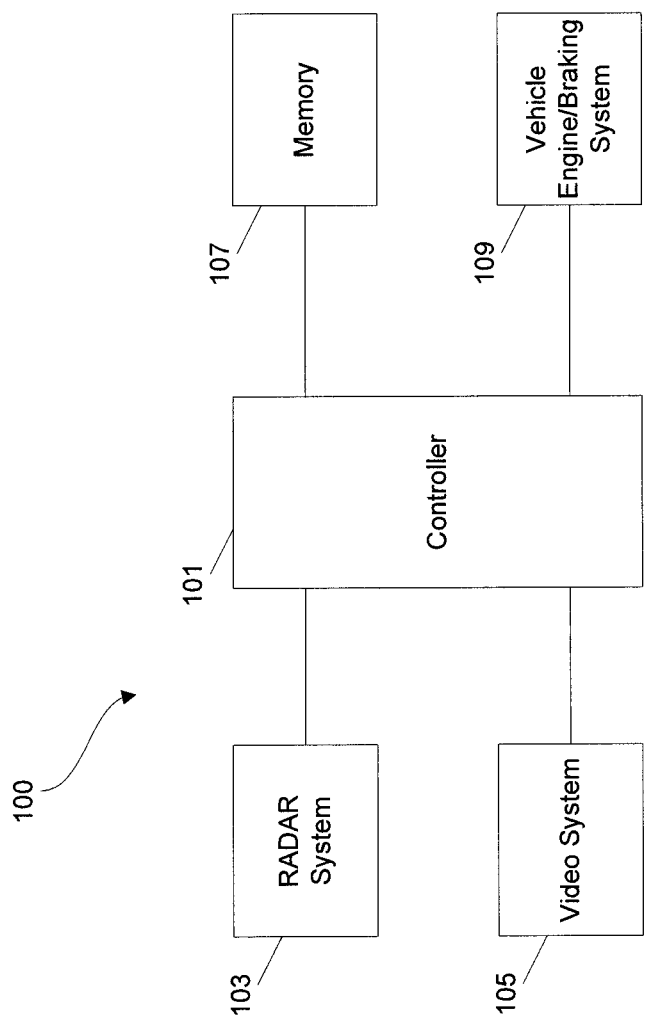

DRIVER ASSISTANCE SYSTEMS USING RADAR AND VIDEO

RELATED APPLICATIONS

This application claims the benefit of U.S. Provisional Patent Application No. 61/499,777 filed on Jun. 22, 2011, the entirety of which is incorporated wherein by reference.

BACKGROUND

The present invention relates to driver assistance systems such as adaptive cruise control and predictive emergency brake systems. These systems detect objects such as other vehicles and stationary obstructions and adjust the control of the engine or apply vehicle braking accordingly to assist the driver in avoiding a collision.

SUMMARY

In one embodiment, the invention provides a driver assistance system that includes a RADAR system, a video system, a brake control unit, and an engine control unit. The RADAR system is mounted on the front of the vehicle and is positioned to detect the location of various objects. The video system captures video images. The engine control unit receives data from both the RADAR system and the video system and identifies objects and their locations based on both the RADAR and the video data. The engine control unit then adjusts the operation of the engine and the vehicle brakes based on the identified objects and their locations. In some embodiments, the driver assistance system also includes a human-machine interface that notifies the driver when an object is identified and located.

In some embodiments, the driver assistance system is configured to identify a "ghost object" mistakenly reported by the RADAR system caused by reflections from a vehicle in an adjacent lane. This detection can be identified as a "ghost object" based on data from the video system.

In some embodiments, the invention provides a driver assistance system that is configured to determine when a vehicle in an adjacent lane has turned off of the road based on both RADAR data and video data. In some embodiments, the driver assistance system is able to determine when a detected object is located beyond a curve and outside of the driver's lane based on both the RADAR data and the video data.

In some embodiments, the invention provides a driver assistance system that includes a RADAR system, a video system, and a vehicle control system. The vehicle control system includes a processor programmed or otherwise configured to receive an indication from the RADAR system of a new object detected in a driving lane occupied by a host vehicle. The vehicle control system then determines if another vehicle has previously been identified as a target vehicle and is currently being monitored by the vehicle control system in an adjacent driving lane. The new object detected by the RADAR system is identified as a target vehicle when there is no other vehicle currently being monitored by the vehicle control system in the adjacent lane. If another vehicle is being monitored in the adjacent lane, the RADAR system is used to determine a relative velocity of the new object and the relative velocity is compared to a threshold. If the relative velocity of the new object is greater than the threshold, the new object is identified as a target vehicle and tracked by the vehicle control system. However, if there is another vehicle being monitored in the adjacent lane and the relative velocity of the new object is less than a threshold, then the vehicle control system checks data from the video system. If the video system confirms that the lane ahead of the host vehicle is clear, then the new object is identified as a non-vehicle and is not tracked or monitored by the vehicle control system.

Other aspects of the invention will become apparent by consideration of the detailed description and accompanying drawings.

BRIEF DESCRIPTION OF THE DRAWINGS

FIG. 1 is a block diagram of the driver assistance system according to one embodiment.

DETAILED DESCRIPTION

Figure 3:
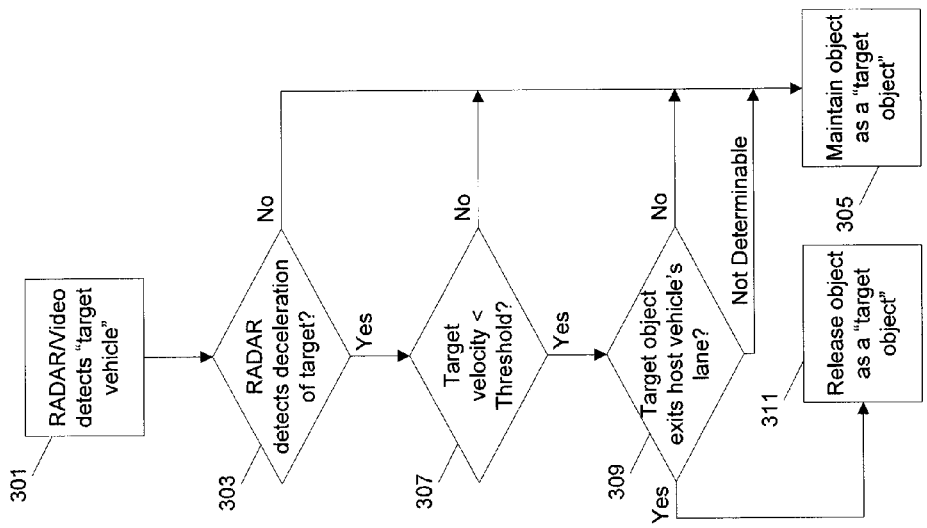
FIG. 3 is a flowchart of a method of determining whether a vehicle in an adjacent lane has turned off of the roadway.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Driver assistance systems are used by vehicles to detect and identify objects on the same roadway. The vehicle in which the driver assistance system is installed is referred to as a "host vehicle." Objects detected and identified by the driver assistance system are referred to as "target vehicles." The system will identify, locate, and track target vehicles and adjust the performance of the vehicle accordingly, for example, by adjusting the engine speed or apply braking.

Systems that use a single sensor, such as RADAR or LIDAR (light detection and ranging), exhibit performance limitations due to the type of sensor employed. Sometimes, single-sensor technologies are not able to distinguish certain traffic situations and react in a proper way. For example, when passing a large truck in an adjacent lane at relatively low speeds, RADAR reflections on the truck can occasionally generate a "ghost object" on the middle of a host vehicles lane. However, this can also occur with other types of vehicle, e.g. car or van. Consequently, a "ghost object" occurs when an object is detected by the RADAR system, but does not actually exist in that location.

Another traffic situation that single-sensor systems may not be able to accurately identify is when a target vehicle in the same lane as the host vehicle or in an adjacent lane makes a sharp turn into another street. In such situations, the target vehicle decelerates quickly due to the sharp turn and the rear end stays in the lane while the target vehicle is rotating into the turn until the target vehicle begins to accelerate in a lateral direction relative to the host vehicle. Driver assistance systems with only a single sensor may have difficulty tracking the target vehicle. Furthermore, single-sensor systems that have difficulty detecting the roadway may have trouble determining whether the driver of the host vehicle intends to follow the target vehicle or follow a different path. As such, the driver assistance system may not be able to determine whether to continue to track the target vehicle or to stop monitoring the turning vehicle.

Yet another traffic situation that single-sensor systems may not be able to accurately process is when a host vehicle is entering a curve in the roadway and a stationary object is located directly in front of the vehicle, but beyond the curve in the roadway.

In these situations, an adaptive cruise control system may cause the host vehicle to brake, indicate an incorrect collision warning, or initiate collision mitigation brake intervention when it is not desired. Furthermore, a "take over request" and even some Predictive Emergency Braking System (PEBS), such as the Forward Collision Warning (FCW), might be triggered in these situations as well.

FIG. 1 illustrates a driver assistance system that uses data from both RADAR and video technologies to improve the accuracy and operation of a driver assistance system. The system 100 includes a controller 101 (in this case, an engine control unit (ECU)) that receives data from a RADAR system 103 and a video system 105. The RADAR system 103 includes a RADAR sensor mounted on the front of a vehicle. The video system 105 includes a video camera also mounted on the front of a vehicle. The RADAR system 103 and the video system 105 each include a separate processor and memory for processing data from each respective sensor. The processed data is then provided to the controller 101. In some embodiments, the system 100 includes a controller area network (CAN) for communicating information between the various systems.

The controller 101 accesses instructions and data stored on a computer-readable memory 107. After further processing the data from the RADAR system 103 and the video system 105, the controller 101 adjusts the operation of a vehicle engine or a braking system 109.

The video system 105 provides enhanced information that is not available from a RADAR system alone. For example, the video system allows for vehicle detection in the adjacent lane at low relative speeds, even if only ¾ of the vehicle is in the camera's field of view (FoV). The video system also allows for tracking of turning vehicles up to an angle of 75 degrees with respect to the host vehicle's longitudinal axis, and as long as the rear end of the vehicle ahead is still fully in the camera FoV.

The video system is also used to provide "Lane Free" information for a vehicle travel area in front of the host vehicle. The vehicle travel area is the area in the host vehicle's lane up to a predetermined distance in front of the host vehicle. The predetermined distance in some embodiments is approximately 30 meters, but can be tuned depending on the type of vehicle or other situational factors. The width of the vehicle travel area is determined by the location of the lane markings on the road, if available. If lane markings are not available or cannot be determined by the video system, the video system will base it's evaluation of an estimated lane width that is equal to the width of the host vehicle plus a tunable distance on each side (e.g., approximately 30 cm).

The video system 105 will produce one of three outputs: (1) road is free, (2) road is not free, or (3) not determinable. The system indicates that the road is free or that the road is not free only when the system is able to make a specific determination. For example, the video system 105 may analyze the color and texture of the roadway in the vehicle travel area to determine whether the lane is free. If the color and texture are uniform within the vehicle travel area, the lane is "free." However, if an object is localized and identified in the vehicle travel area, the lane is "not free."

If the roadway is not a uniform surface, the video system 105 may not be able to make a conclusive determination and will indicate such. This may occur if there are "wear" marks from tires of other vehicles, if the roadway is under repair, or if the roadway is constructed of a material such as gravel. The video system 105 may also return a "not determinable" result if the camera of the video system is not available or is obstructed.

If the RADAR system 103 detects an object in the host vehicle's lane while the video system 105 indicates that the lane is not free, then the controller 101 reacts by adjusting the operation of the vehicle engine/braking system 109 based on the ACC or PEBS algorithms. If, however, the RADAR system 103 detects an object in the host vehicle's lane while the video system 105 indicates that the lane is free, then the controller 101 disregards the "object" detected by the RADAR system 103.

If the video system 105 is not able to determine whether the lane is free (e.g., returns "not determinable"), the controller 101 must make a determination based on another means. In some cases, the driver assistance system 100 includes additional sensors to assist in the determination. In other cases, the driver assistance system 100 defers to the RADAR system 103 if the output of the video system 105 is "not determinable" and the controller 101 adjusts the vehicle engine/braking system 109 as though an object has been detected.

For some driver assistance system feature, such as PEBS, the video system will analyze an extended vehicle travel area. The length of the extended vehicle travel area extends further than the vehicle travel area discussed above (for example, up to 60 meters). When system features use this extended lane free determination, only the areas between the lane markings are evaluated. If lane markings are unavailable, then the video system 105 returns a "not determinable" output. Similarly, if the video system 105 cannot accurately see to a specified indicator range, the output of the video system will be "not determinable." In the event that the video system 105 returns a "lane free" indication for the extended range, this indication is used to suppress or postpone the FCW or brake-intervening collision mitigation events in situations where metal objects exist just beyond where the host vehicle will enter a curve.

Figure 2:
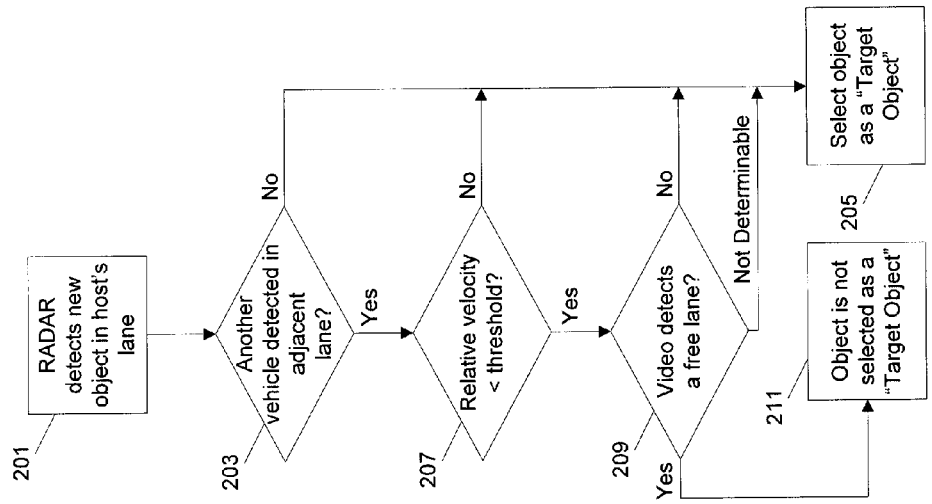
FIG. 2 is a flowchart of a method of determining whether a new object detected by the RADAR system is a vehicle or a ghost object.

FIGS. 2 and 3 illustrate specific methods by which the driver assistance system 100 uses data from both the RADAR system 103 and the video system 105 to control the operation of the vehicle. FIG. 2 illustrates a method of determining whether an "object" detected by the RADAR system is a "ghost object" or an actual object. After the RADAR system 103 detects a new object in the host vehicle's lane (step 201), the system determines whether another vehicle (e.g. car, semi truck, etc.) has been previously identified as a "target object" in the adjacent lane (step 203). If not, the new object detected by the RADAR system 103 is selected as a "target object" (step 205) and tracked by the driver assistance system 100.

If another vehicle has been previously detected in an adjacent lane, the system performs additional checks to determine if the new object is actually a "ghost object" created by RADAR reflections off of the other vehicle as the host vehicle passes the other vehicle at relatively low speeds. The system compares the relative velocity of the other vehicle to a threshold (step 207). If the relative velocity is greater than a threshold, the new object is identified as an actual target object (step 205). If the relative velocity is less than the threshold, the system defers to the determination of the video system 105.

If the video system 105 determines that the host vehicle's lane is free (step 209), then the system ignores the new object detected by the RADAR system (step 211). If the video system 105 determines that the lane is not free, then the output of the RADAR system is confirmed and the new object is identified as an actual target object (step 205). Furthermore, in this example, the system identifies the new object as an actual object if the video system is unable to confirm whether the lane is free and returns an output of "not determinable."

FIG. 3 illustrates a method of determining when a vehicle that has been previously identified as a "target vehicle" makes a sharp turn off the roadway and should no longer be tracked by the driver assistance system. The RADAR and video systems have already identified an object as a "target vehicle" and are tracking its location (step 301). If the system determines that the "target vehicle" is decelerating (step 303), the system begins to analyze whether to release the vehicle as a "target vehicle" and stop tracking its location. Otherwise, the system maintains the object as a "target vehicle" (step 305) and continues to track its location.

If it is determined that the target vehicle is decelerating, the system compares the velocity of the target vehicle to a threshold (step 307). If the velocity of the target vehicle is less than the threshold, the system defers to the video system to determine whether it has left the lane. Otherwise, the system continues to track the vehicle as a "target object" (step 305). The video system is configured to detect vehicles in the host vehicle's lane that are positioned at an angle relative to the host vehicle (for example, at least 75 degrees). Therefore, even when the target vehicle begins to turn to exit the lane, the video system is able to detect that the target vehicle is still at least partially in the host vehicle's lane. The video system determines whether the target vehicle has left the host vehicle's lane (step 309) and concludes that the target vehicle should no longer be tracked (step 311).

If, however, the video system does not confirm that the target vehicle is turning and is at an angle greater than the angle threshold, the system continues to monitor the vehicle as a "target object" (step 305). Again, if the video system is unable to confirm whether the vehicle is turning at a relative angle greater than the angle threshold, the system continues to monitor the vehicle as a "target object."

The RADAR/video fusion functionality is dependent upon the ability of the video system 105 to operate properly. Therefore, if the video system is blind or not operational (e.g., if an error mode is entered), the system will default to RADAR only methods for controlling the driver assistance system. In the methods illustrated in FIGS. 2 and 3, the video system would return a "not determinable" condition at steps 209 and 309, respectively. However, in other systems, the video system would be actively disabled when an error condition or an obstructed view is detected. The control unit or the RADAR system would then run a different algorithm using only the RADAR system.

Thus, the invention provides, among other things, a driver assistance system that improves the accuracy of the system by analyzing data from both RADAR and video systems. Furthermore, although the examples described above analyze RADAR and video data, the invention can be implemented using other combinations of detection systems. For example, a system may analyze RADAR data and LIDAR (light distance and ranging) data while yet other systems use a combination of LIDAR and video data.

What is claimed is:

1. A driver assistance system comprising:
   a RADAR system;
   a video system; and
   a vehicle control system, the vehicle control system including a processor configured to:
      identify a first object as a target vehicle when both the RADAR system and the video system detect the first object in a driving lane occupied by a host vehicle,
      identify a second as a non-target-vehicle when the video system detects the second object in the driving lane and the RADAR system does not detect the second object in the driving lane,
      track position and speed of the target vehicle,
      operate the host vehicle based at least in part on position and speed of the target vehicle;
      receive an indication from the RADAR system that a previously detected target vehicle in the driving lane occupied by the host vehicle is decelerating, and
      release the previously detected target vehicle as a target vehicle and cease monitoring of the previously detected target vehicle when a velocity of the previously detected target vehicle is below a threshold and the previously detected target vehicle exits the driving lane occupied by the host vehicle, wherein the RADAR system is configured to determine the velocity of the previously detected target vehicle.

2. The driver assistance system of claim 1, wherein the processor of the vehicle control system is further configured to identify the first object as a target vehicle when
   the RADAR system detects the first object in the driving lane, and
   the video system identifies the driver lane and confirms that the driving lane is occupied.

3. The driver assistance system of claim 1, wherein the processor of the vehicle control system is further configured to track a plurality of target vehicles in the driving lane occupied by the host vehicle and one or more adjacent lanes.

4. The driver assistance system of claim 3, wherein the processor of the vehicle control system is further configured to:
   receive a signal from the RADAR system indicating that a new object is detected in the driving lane occupied by the host vehicle,
   determine if another vehicle has previously been identified as a target vehicle in one or more of the adjacent lanes, and
   identify the new object detected by the RADAR system as a target vehicle when there is no other vehicle currently being tracked in the one or more adjacent lanes.

5. The driver assistance system of claim 4, wherein the processor of the vehicle control system is further configured to:
   compare a velocity of the new object detected by the RADAR system to a threshold; and
   identify the new object detected by the RADAR system as a target vehicle when another vehicle is currently being tracked in the one or more adjacent lanes and the velocity of the new object is greater than the threshold.

6. The driver assistance system of claim 1, wherein the processor of the vehicle control system is further configured to maintain the previously detected target vehicle as a target vehicle and continue monitoring of the previously detected target vehicle when the velocity of the previously detected target vehicle is below the threshold and the video system confirms that the previously detected target vehicle has not exited the driving lane occupied by the host vehicle.

7. The driver assistance system of claim 1, wherein the processor of the vehicle control system is further configured to monitor the speed and position of the target vehicle, and operate a cruise control system of the host vehicle based at least in part on the speed and position of the target vehicle.

8. The driver assistance system of claim 7, wherein the processor of the vehicle control system is further configured to transmit a signal instructing an operator of the host vehicle to disengage the cruise control system and resume normal operation of the host vehicle based on the speed and position of the target vehicle.

9. The driver assistance system of claim 7, wherein the processor of the vehicle control system is further configured to activate a predictive emergency braking system of the host vehicle when a collision between the target vehicle and the host vehicle is predicted.

10. The driver assistance system of claim 7, wherein the processor of the vehicle control system is further configured to transmit a signal warning the operator of the host vehicle of a predicted forward collision between the host vehicle and the target vehicle.

11. A driver assistance system comprising:
a RADAR system;
a video system; and
a vehicle control system, the vehicle control system including a processor configured to:
receive an indication from the RADAR system of a new object detected in a driving lane occupied by a host vehicle,
determine if another vehicle has previously been identified as a target vehicle and is currently being monitored by the vehicle control system in an adjacent driving lane,
identify the new object as a target vehicle when there is no other vehicle currently being monitored by the vehicle control system in the adjacent lane,
determine, by the RADAR system, a relative velocity of the new object,
identify the new object as a target vehicle when the relative velocity of the new object is greater than a threshold,
identify the new object as a non-target-vehicle when another vehicle is currently being monitored by the vehicle control system in an adjacent lane, the relative velocity of the new object is below the threshold, and the video system detects a free lane ahead of the host vehicle,
receive an indication from the RADAR system that a previously detected target vehicle in the driving lane occupied by the host vehicle is decelerating, and
release the previously detected target vehicle as a target vehicle and cease monitoring of the previously detected target vehicle when a velocity of the previously detected target vehicle is below a threshold and the previously detected target vehicle exits the driving lane occupied by the host vehicle,
wherein the RADAR system is configured to determine the velocity of the previously detected target vehicle.

12. The driver assistance system of claim 11, wherein the processor of the vehicle control system is further configured to identify the new object as a target vehicle when another vehicle is currently being monitored by the vehicle control system in an adjacent lane, the relative velocity of the new object is below the threshold, and the video system is unable to determine whether there is a free lane ahead of the host vehicle.

* * * * *